US008009096B2

(12) United States Patent
Harel et al.

(10) Patent No.: US 8,009,096 B2

(45) **Date of Patent: *Aug. 30, 2011**

(54) METHOD, SYSTEM AND APPARATUS FOR DETERMINING ANTENNA WEIGHTING FOR TRANSMIT DIVERSITY

(75) Inventors: Haim Harel, New York, NY (US); Kenneth Kludt, Bedminster, NJ (US); Yair Karmi, Bridgewater, NJ (US)

(73) Assignee: Magnolia Broadband Inc., Warren, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/706,583

(22) Filed: Feb. 16, 2010

(65) Prior Publication Data

US 2010/0141528 A1 Jun. 10, 2010

Related U.S. Application Data

(63) Continuation of application No. 12/003,509, filed on Dec. 26, 2007, now Pat. No. 7,663,545.

(60) Provisional application No. 60/876,986, filed on Dec. 26, 2006.

(51) Int. Cl.
*H01Q 3/00* (2006.01)
*H04B 7/00* (2006.01)

(52) U.S. Cl. ........................................ 342/368; 342/367

(58) Field of Classification Search .................. 342/367, 342/368, 372, 373, 383; 455/69, 104, 126, 455/127.1

See application file for complete search history.

(56) References Cited

U.S. PATENT DOCUMENTS

| | | | |
|---|---|---|---|
| 5,642,353 | A | 6/1997 | Roy, III et al. |
| 5,832,044 | A | 11/1998 | Sousa et al. |
| 5,991,330 | A | 11/1999 | Dahlman et al. |
| 5,999,826 | A | 12/1999 | Whinnett |
| 6,185,440 | B1 | 2/2001 | Barratt et al. |
| 6,226,509 | B1 | 5/2001 | Mole et al. |
| 6,236,363 | B1 | 5/2001 | Robbins et al. |
| 6,330,294 | B1 | 12/2001 | Ansbro et al. |
| 6,331,837 | B1 | 12/2001 | Shattil |
| 6,343,218 | B1 | 1/2002 | Kaneda et al. |
| 6,392,988 | B1 | 5/2002 | Allpress et al. |
| 6,492,942 | B1 | 12/2002 | Kezys |
| 6,636,495 | B1 | 10/2003 | Tangemann |

(Continued)

FOREIGN PATENT DOCUMENTS

EP 0 986 193 3/2000

(Continued)

OTHER PUBLICATIONS

Derryberry et al., "Transmit Diversity in 3G CDMA Systems", Wideband Wireless Access Technologies to Broadband Internet, IEEE Communications Magazine, Apr. 2002, pp. 68-75.

(Continued)

*Primary Examiner* — Dao L Phan

(74) *Attorney, Agent, or Firm* — Pearl Cohen Zedek Latzer, LLP

(57) ABSTRACT

A method, system and apparatus for determining at least one relative characteristic of a transmit diversity transmitter based on at least one quality indicator based on signals received on the plurality of antennas. In some embodiments of the invention, the relative characteristic may be a relative power or amplitude ratio and/or a phase difference between the signals transmitted on the different antennas.

10 Claims, 2 Drawing Sheets

U.S. PATENT DOCUMENTS

| | | | |
|---|---|---|---|
| 6,704,370 B1 | 3/2004 | Chheda et al. | |
| 6,745,009 B2 | 6/2004 | Raghothaman | |
| 6,810,264 B1 | 10/2004 | Park et al. | |
| 6,859,643 B1 | 2/2005 | Ma et al. | |
| 6,882,228 B2 | 4/2005 | Rofougaran | |
| 7,321,636 B2 | 1/2008 | Harel et al. | |
| 7,663,545 B2 * | 2/2010 | Harel et al. | 342/368 |
| 2003/0112880 A1 | 6/2003 | Walton et al. | |
| 2004/0048584 A1 | 3/2004 | Vaidyanathan et al. | |
| 2004/0085239 A1 | 5/2004 | Ukena et al. | |
| 2005/0059355 A1 | 3/2005 | Liu | |
| 2005/0143113 A1 | 6/2005 | Lee et al. | |

FOREIGN PATENT DOCUMENTS

| | | |
|---|---|---|
| EP | 1 282 242 | 2/2003 |
| EP | 1 282 244 | 2/2003 |
| EP | 1 284 545 | 2/2003 |
| EP | 1 262 031 | 5/2004 |
| GB | 2 353 437 | 2/2001 |
| JP | 09-238098 | 9/1997 |
| JP | 2000-151484 | 5/2000 |
| WO | WO 97/24818 | 7/1997 |
| WO | WO 00/79701 | 12/2000 |
| WO | WO 01/69814 | 9/2001 |
| WO | WO 03/090386 | 10/2003 |
| WO | WO 2004/045108 | 5/2004 |
| WO | WO 2005/081444 | 9/2005 |

OTHER PUBLICATIONS

Rashid-Farrokhi, et al., “Transmit Beamforming and Power Control for Cellular Wireless Systems”, IEEE Journal on Selected Areas in Communications, vol. 16, No. 8, Oct. 1998, pp. 1437-1450.

* cited by examiner

METHOD, SYSTEM AND APPARATUS FOR DETERMINING ANTENNA WEIGHTING FOR TRANSMIT DIVERSITY

CROSS-REFERENCE TO RELATED APPLICATIONS

This application is a continuation of U.S. patent application Ser. No. 12/003,509, filed Dec. 26, 2007, issued Feb. 16, 2010 as U.S. Pat. No. 7,663,545, which in turn claims the benefit of U.S. Provisional Patent Application No. 60/876,986, filed on Dec. 26, 2006, both of which are incorporated in their entirety herein by reference.

FIELD OF THE INVENTION

The present invention relates to antenna weighing for transmit diversity in wireless systems, and in particular to using received link quality characteristics to determine antenna weighting.

BACKGROUND OF THE INVENTION

Prior patents and publications teach antenna transmit diversity based on a quality indicator feedback. Insofar as such feedback mechanisms are typically implemented with a round trip delay, their performance may depend on the intensity and speed of fading and other factors that contribute to environment changes. Therefore, approximation and simplifications are used, thereby sacrificing performance, thereby reducing practical antenna diversity gain.

SUMMARY OF EMBODIMENTS OF THE INVENTION

Embodiments of the invention relate to a wireless mobile station that uses more than one antenna for both the reception and the transmission functions. When one antenna performs better than another, by design, fading, blocking, or any other reason, it may be desirable to increase the effect of the signal transmitted by that antenna. Likewise, when one antenna performs more poorly than another, by design, fading, blocking, or any other reason, it may be desirable to decrease the effect of the signal transmitted by that antenna.

According to embodiments of the invention, uplink antenna performance may be predicted or estimated based on downlink performance. The method, system and apparatus of the invention may therefore use downlink signal quality measurements in a mobile communication environment to establish or affect relative transmission characteristics for the antennas on the uplink transmission.

According to embodiments of the present invention, data from the two (or more) antennas receiving a downlink signal for adjusting at least one relative characteristic of the uplink transmission signal sent using two (or more) antennas. In some embodiments of the invention, the relative characteristic may be a relative power or amplitude ratio between the signals transmitted on the different antennas. In some embodiments of the invention, the relative characteristic may be a phase difference or phase ratio of the signals being transmitted by the mobile station by the respective antennas. Some embodiments may modify more than one relative characteristic of the diversity transmission signals.

Because the reception and/or transmission quality of the antennas may vary with time, for example, due to motion by the mobile unit, it may be desirable to change the relative characteristics of the transmission signals periodically, or based on changing conditions or circumstances, or based on at least one or a combination of trigger events.

BRIEF DESCRIPTION OF THE DRAWINGS

Embodiments of the invention are illustrated by way of example and not limitation in the figures of the accompanying drawings, in which like reference numerals indicate corresponding, analogous or similar elements, and in which.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Figure 1:
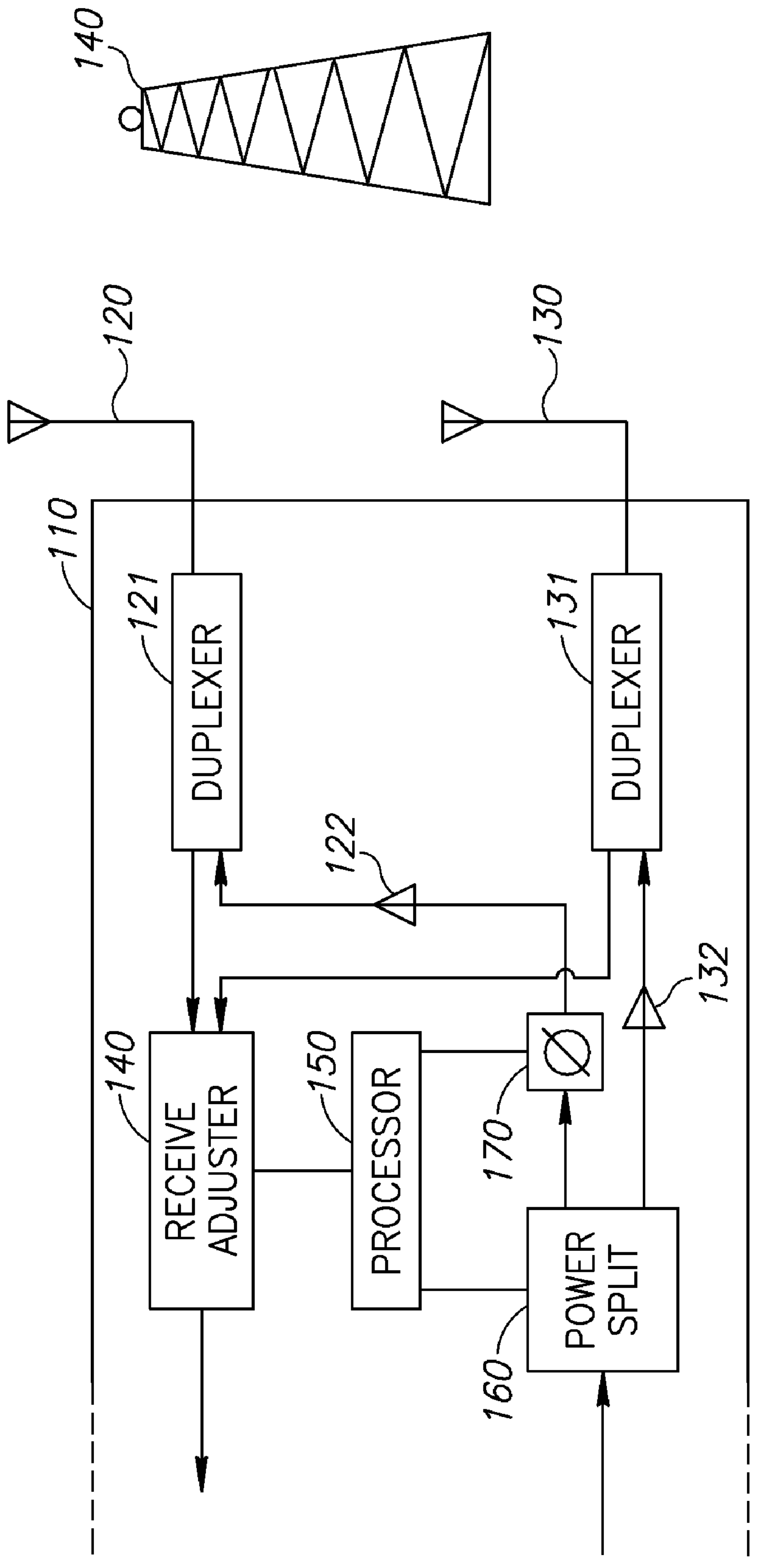
FIG. 1 is an exemplary block diagram of a system including a wireless mobile station according to an embodiment of the invention.

FIG. 1 is an exemplary block diagram illustrating a system according to the present invention including a mobile wireless station 110 according to embodiments of the present invention and a base station 190. Mobile wireless station 110 may include or be connected to antennas 120 and 130. Antennas 120 and 130 may be used for reception of signals by wireless station 110 and transmission of signals from wireless station 110. It will be recognized that while two antennas have been depicted for simplicity, the present invention may be applied to mobile stations having more than two transmit/receive antennas using the principles described herein.

According to embodiments of the present invention, a relative characteristic between signals transmitted by antennas 120 and 130 may be established at least in part using information derived from the signals received by antennas 120 and 130. Received signals received over a wireless channel at antennas 120 and 130 may be extracted and adjusted. In one embodiment of the present invention depicted in FIG. 1, duplexers 121 and 131 may be attached to antennas 120 and 130, respectively. It will be recognized that duplexing transmit and receive signals may be performed in any number of ways, and that the present invention is independent of the technique used for duplexing transmit/receive signals. Moreover, it will be recognized that mobile wireless station 110 may include other components that may relate to data transmission and/or reception, for example, additional elements may be added in implementations of the present invention to add and/or improve functionality.

The receive power ratio and/or phase difference between received signals from different antennas may be preserved for analysis. For example, signals received at antennas 120 and 130 may be received and analyzed at a receive adjuster 140. Receive adjuster may compare, process, or otherwise analyze received signals and provide a quality indication signal to processor 150. It will be recognized that in some embodiments of the invention, receive adjuster 140 and processor 150 may be combined with each other and/or with other elements of wireless unit 110. The received signal may be further passed along for processing, for example, by a baseband processor (not shown).

Processor 150 may use an analysis of power ratio and/or phase information from received signals to determine at least one relative characteristic, e.g., power ratio and/or phase difference among antennas 120 and 130 that may be used for transmission using transmit diversity. Embodiments of the present invention may use a statistical relationship between received and transmitted signals, and for example, processor 150 may analyze relationships between received signals that may come from various antennas, antennas 120 and 130, and may draw conclusions regarding an optimal relationship between transmitted signals, and may thereby optimize a transmit diversity performance.

Embodiments of the invention may use quality indicators that may be measured by a mobile receiver, or wireless station 110, on a downlink and may choose a best power ratio for a transmit link, e.g., an uplink in a mobile wireless station 110. Possible measurements may include, but are not limited to, a received signal level (Io), a pilot amplitude (EP or ECP), a ratio of a pilot signal amplitude to a noise level (ECP/Nt), a traffic power per bit required (Eb) or a traffic power to noise ratio (Eb/Nt) or ratios of each of these measurements (e.g., (ECP/Nt)/(Eb/No)), for each receiving antenna, and each may be taken separately and/or combined.

Based on the analysis of the receive signals, processor 150 may control or determine relative characteristics of transmitted signals, for example, a power ratio between signals to be transmitted by antenna 120 and antenna 130, respectively. In the simplified embodiment shown, processor 150 may determine a power ratio by controlling a power splitter 160, which in turn may receive a signal for transmission, and determine the amount of transmit power delivered to antenna 120 and antenna 130, respectively. Alternatively or additionally, processor 150 may control a phase difference between signals to be transmitted by antennas 120 and 130, respectively. In the simplified embodiment shown, processor 150 may determine a phase difference by controlling a phase rotator 170, which in turn may introduce the amount of a phase difference between signals delivered to antenna 120 and antenna 130, respectively. The signals for transmission may be amplified prior to transmission using respective power amplifiers 122 and 132. In some embodiments, processor 150 may control more than one phase rotator, for example, one phase rotator for each antenna.

According to some embodiments of the invention, correlation between received signals from antennas 120 and 130, may be used by processor 150 to select a preferred or optimal antenna to be used for transmission. According to embodiments of the invention, the value of a weighting may be derived, or coarse weightings may be improved, by drawing statistical conclusions from the relationships of the received signals. For example, in a case of two antennas, where a first antenna 120, may receive a stronger signal than a second antenna 130, an assumption may be that the first antenna 120 may be better for transmitting, as well. Additionally or alternatively, an extent of this better performance may be used to factor a ratio of distributing a power between a first and second transmitting chain, where a chain may be a set of components that may be used for transmission and may be connected to a first antenna and a second antenna, respectively. Such a process may be represented in general as:

$$\Delta(A\alpha/A\beta)_T = \Delta(A\alpha/A\beta)_R \quad (1)$$

where $\Delta(A\alpha/A\beta)_T$ may be a desired change in transmit amplitude ratio for a first antenna, A and a second antenna, B, and $\Delta(A\alpha/A\beta)_R$ may be a received difference in a receiver link measurement for a first antenna, A and a second antenna, B (e.g., EP, ECP, ECP/Nt, Io, (ECP/Nt)/(Eb/No), etc.). A receiver link may be a downlink for a mobile station. It will be understood that other statistical calculations may be performed using the receive signal quality indicators, for example, a weighted sum of a number of recent received signal power changes may be used, for example, giving more weight to more recent changes.

Variations may be possible within the scope of the invention, for example, processor 150 may compare a relative phase on a receive link and extend and/or apply it to a transmit uplink. For example, in a frequency division multiplexing (FDM) network, a rate of change of a phase difference between signals received on two antennas may be used to predict a desired rate of change of a phase on an uplink. Such a process may be represented by:

$$\Delta\Phi_T = -\Delta\Phi_R \cdot f_T/f_R \quad (2)$$

where $\Delta\Phi_T$ may be a desired change in transmit phase, $\Delta\Phi_R$ may be a received difference in a downlink phase, and $f_T/f_R$ may be a ratio of a transmit frequency and a receive frequency. It will be understood that other statistical calculations may be performed using the receive signal quality indicators, for example, a weighted sum of a number of recent received signal phase difference changes may be used, for example, giving more weight to more recent changes.

Figure 2:
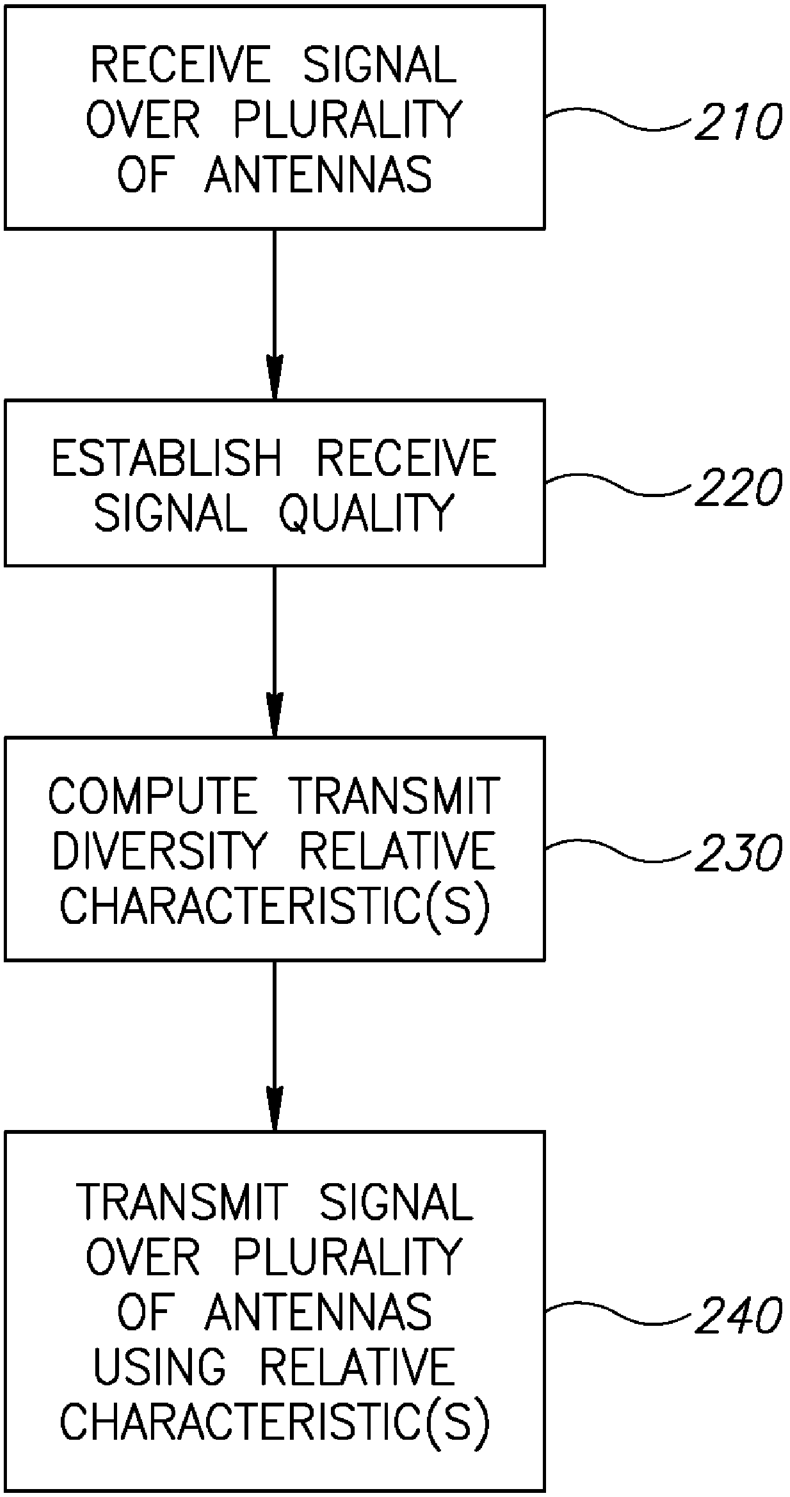
FIG. 2 is an exemplary flowchart illustrating a method in accordance with an embodiment of the present invention.

FIG. 2 is flow chart illustrating a method that may be used to determine a signal distribution for a transmission. FIG. 2 may refer to an embodiment of the invention using a plurality of two or more antennas. At block 210, a signal is received over a plurality of antennas of a mobile wireless station over a wireless channel. At block 220, a receive signal quality or other receive signal characteristic may be established based on the signal as received by the plurality of antennas. At block 230, at least one transmit diversity relative characteristic may be calculated, for example, based on a statistical relationship between a power ratio and/or phase differences between the receive signals. At block 240 a transmit signal is sent over the plurality of antennas using the at least one calculated relative characteristic.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method of transmitting a signal from a mobile communication device comprising:
- receiving at said mobile communication device a first signal over a plurality of antennas to obtain a respective plurality of receive signals;
- determining at least one relative quality indicator of said receive signals as received at said mobile communication device, wherein said relative quality indicator is selected from the group consisting of: received signals power ratio, received signals phase information, and any combination thereof;
- calculating at least one relative transmit characteristic based on said relative quality indicator; and
- transmitting from said mobile communication device a second signal over said plurality of antennas by applying said at least one relative transmit characteristic to at least one signal path associated with one of said antennas.

2. The method of claim 1, wherein said at least one relative transmit characteristic comprises a phase difference among respective transmit paths associated with said plurality of antennas.

3. The method of claim 2, wherein transmitting said second signal over said plurality of antennas comprises applying said phase difference to at least one signal path associated with one of said antennas.

4. The method of claim 1, wherein said at least one relative transmit characteristic comprises a power ratio among respective transmit paths associated with said plurality of antennas.

5. The method of claim 4, wherein transmitting said second signal over said plurality of antennas comprises applying said power ratio to at least one signal path associated with one of said antennas.

6. A mobile wireless apparatus comprising:

a plurality of antennas adapted to receive and transmit signals; and a processor to analyze a relative quality indicator among receive signals received at said plurality of antennas, said relative quality indicator indicative of the quality of the receive signals as received at the mobile communication apparatus, to calculate at least one relative transmit characteristic based on said relative quality indicator, and to apply said at least one relative transmit characteristic to at least one signal path associated with one of said antennas, wherein said relative quality indicator is selected from the group consisting of:

received signals power ratio, received signals phase information, and any combination thereof.

7. The mobile wireless apparatus of claim 6, wherein said at least one relative transmit characteristic comprises a phase difference among respective transmit paths associated with said plurality of antennas.

8. The mobile wireless apparatus of claim 7, wherein said processor is to apply said at least one relative transmit characteristic by applying said phase difference to at least one signal path associated with one of said antennas.

9. The mobile wireless apparatus of claim 6, wherein said at least one relative transmit characteristic comprises a power ratio among respective transmit paths associated with said plurality of antennas.

10. The mobile wireless apparatus of claim 8, wherein said processor is to apply said at least one relative transmit characteristic by applying said phase difference to at least one signal path associated with one of said antennas.

* * * * *